United States Patent Office 3,761,371
Patented Sept. 25, 1973

3,761,371
ELECTRODEPOSITION OF COATING MATERIALS COMPRISING PARTICULATE ELASTOMERS
Ray A. Dickie, Pleasant Ridge, Olin B. Johnson, Livonia, and Santokh S. Labana, Dearborn Heights, Mich., assignors to Ford Motor Company, Dearborn, Mich.
No Drawing. Filed Dec. 21, 1970, Ser. No. 100,391
Int. Cl. B01k 5/02; C23b 13/00
U.S. Cl. 204—181
6 Claims

ABSTRACT OF THE DISCLOSURE

Electrodepositable coating materials are provided which comprise particulate elastomeric materials. These particulate elastomers may be (1) mechanically mixed with an electrodepositable carrier resin and electrodeposited therewith without chemical reaction therewith before or after electrodeposition, (2) mechanically mixed with a conventional electrodeposition carrier resin and chemically reacted with the resin during curing, (3) chemically reacted with an electrodepositable carrier resin prior to its electrodeposition, (4) chemically reacted with monomers or low molecular weight prepolymers which provide the resultant reaction product with ionizable surface functionality to impart polyelectrolyte behavior to the material when dispersed in a suitable aqueous medium, (5) or provided directly with such ionizable surface functionality. This invention has application in both anodic and cathodic deposition. The electrodepositable materials can be devised for conventional heat curing, air drying, or curing by ionizing radiation, e.g. exposure to an electron beam. In one embodiment, the particulate elastomers have an outer shell of a glass-like organic polymer. In one embodiment, the electrodeposited material has alpha-beta olefinic unsaturation.

BACKGROUND OF THE INVENTION

The electrodeposition of organic materials has been known to the art at least since 1919 and the publication of U.S. Pat. 1,294,626 to Davey. Early work in electrodeposition involved electrodeposition of essentially neutral materials, e.g. wax, rubber latices, polyethylene, polytetrafluoroethylene, etc., and natural resins such as shellac. Much of this early work involved the electrodeposition of natural rubber latex. Rubber latex deposits as a porous film. Since the deposit does not build up a film of high electrical resistance, the build up is not self-terminating. Between 1919 and about 1960, other attempts to electrodeposit coating materials met little or no acceptance in industrial coating. The first industrially acceptable process for applying paint by electrodeposition took the form of electrodepositing a synthetic, polycarboxylic acid resin having acid number above about 30 from an aqueous dispersion of water and amine and forming a film of high electrical resistance. At a given impressed voltage, the deposition of this film is self-terminated for all practical purposes when this resistance reduces the current flow to insignificance. This resistance also serves to provide a leveling of coverage in that the area of greatest electrical attraction are coated first and the area of greatest current flow moves to more remote and electrically shielded areas of the resistance builds on the earlier coated areas. This mode of electrodeposition is taught by Allen E. Gilchrist in U.S. Pat. 3,230,162. A large number of later patents teach coatings for and embodiments of this process.

THE INVENTION

This invention is concerned with the electrodeposition of particulate elastomers from an aqueous bath either in combination with anodically or cathodically electrodepositable resins, as a reaction product of the particulate elastomer and a monomer or low molecular weight prepolymer that provides the reaction product with ionizable surface functionality, e.g., carboxyl or amino, which imparts electrolyte behavior to the material when dispersed in aqueous medium containing a suitable dispersal assistant, or as such when the particulate elastomer is provided with ionizable surface functionality. When electrodeposited with a carrier resin, the elastomer particles may have no surface functionality. However, it is preferred to employ particles which are either adapted to crosslink with the carrier resin during the curing of the electrodeposited film or particles which are reacted with the resin prior to electrodeposition.

This invention has application to both anodic and cathodic electrodeposition. In those embodiments involving anodic deposition, the organic material to be electrodeposited has functional groups which in the presence of water and water-soluble base ionize to provide an anionic electrolyte when dispersed in the bath. These are ordinarily carboxylic acid groups and are present in plurality such that, except in the case of very small particles, this will ordinarily be an anionic polyelectrolyte. The water-soluble bases which are useful include, but not by way of limitation, amines, ammonia, and inorganic bases such as potassium hydroxide, lithium hydroxide, and sodium hydroxide. Where corrosion is a factor, it is preferable to employ a mild base such as a water soluble amine. In those embodiments involving cathodic deposition, the organic material to be electrodeposited has functional groups which in the presence of water and a water-soluble acid ionize to provide a cationic electrolyte when dispersed in the bath. These groups can be provided by proper incorporation of a suitable amine in the polymeric material to be deposited.

The carrier resin, the reaction product of elastomer and monomer and/or prepolymer, or the outer surfaces of the elastomer particle, as the case may be, may be provided with alpha-beta olefinic unsaturation by techniques known in the art and hereinafter illustrated. When such unsaturation is provided these materials may be crosslinked with similarly unsaturated materials by ionizing radiation, e.g., an electron beam having average energy in the range of about 100,000 to about 500,000 electron volts. Thus, it is also within the scope of this invention to employ in the electrodeposition bath vinyl monomers, e.g., acrylic acid, methacrylic acid, esters of acrylic or methacrylic acid and $C_1-C_8$ monohydric alcohols or glycols, or low molecular weight non-monomeric organic materials having alpha-beta olefinic unsaturation. It is also within the scope of this invention to provide these particulate elastomers or reaction products thereof with a functionality adapted for heat curing, e.g., epoxide groups, carboxyl groups, amine groups, hydroxyl groups, etc. It is also within the scope of this invention to provide these particulate elastomers or reaction products thereof with a functionality adapted for heat curing, e.g., epoxide groups, carboxyl groups, amine groups, hydroxyl groups, etc. It is also within the scope of this invention to electrodeposit such particulate elastomers in a system designed in a manner such that the resultant deposit is curable by air drying.

(I) THE PARTICULATE ELASTOMER

The particulate elastomer has average diameter in the range of about 0.02 to about 5, advantageously in the range of about 0.02 to 1, and preferably in the range of about 0.02 to 0.2 micron.

In several embodiments, the particulate elastomer comprises a rubber or rubber-like core encased in a glass-like polymeric shell, e.g., poly(methyl methacrylate) or a copolymer of methyl methacrylate and other alpha-beta olefinically unsaturated monomers. In these embodiments, the core may be any rubber that can be prepared by emulsion polymerization or dispersion polymerization in hydrocarbon medium. These include, but not by way of limitation, crosslinked acrylic polymers formed from a major amount of a monoacrylate and a crosslinking amount of a di- or tri-functional monomer having two or more non-conjugated terminal ethylenic groups, e.g., a diacrylate, a dimethacrylate, divinyl benzene, a triacrylate, or trimethylacrylate. They also include similarly crosslinked rubbers prepared from butadiene, a mixture of a major amount of butadiene with a minor amount of styrene or acrylonitrile, dimethylbutadiene, chloroprene, etc., may also be used as core materials. Other types of crosslinked rubbers such as polydimethylsiloxane, polyurethanes and polythioethers may also be used. These materials may be used as the entire elastomeric particle or they may be encased in a shell of nonrubber polymer such as that used in the graded-rubber particles herein described or illustrated. When such a shell is used, it may have surface functionality in the manner of the graded-rubber particles hereinbefore and hereinafter disclosed.

In the preferred embodiment, the particulate elastomer comprises a core of rubber-like, crosslinked acrylic polymer and a glass-like, polymeric, outer shell. This outer shell consists essentially of a copolymer of about 30 to about 98 molar parts of methyl methacrylate and about 2 to about 70 molar parts of monomers copolymerizable with methyl methacrylate, at least one of which provides the particle with the desired surface functionality. Advantageously, the particle also has an intermediate layer consisting essentially of the copolymerization product of monomers used to form the core and monomers used to form the outer shell.

The process for preparing these particulate materials is at least a two stage process. A major amount of monofunctional monoacrylate is emulsion copolymerized in the first stage with a crosslinking amount of a di- or tri-functional monomer containing two or more non-conjugated terminal ethylenic groups, preferably a diacrylate, using a water-soluble free radical initiator and a suitable surfactant to yield a latex of relatively uniform particle size, e.g., 0.04 to 1 micron average diameter. Before this reaction reaches substantial completion, i.e., when the reaction is between about 50 and about 90, preferably between about 70 and about 89, percent complete, the second stage monomeric component, i.e., methyl methacrylate and one or more monomers copolymerizable therewith, is added slowly to the reaction mixture. The polymerization process is continued to yield a stable latex of relatively uniform particle size and composition as evidenced by electron microscopy. Additional surfactant may be added simultaneously with the second stage monomeric component.

Generically, the particles are prepared from monomers that will provide a crosslinked, acrylic, rubber-like core and a glass-like polymeric outer shell at room temperature, e.g., 20°-30° C. The terms rubber-like and glass-like are, of course, meaningless except when used in reference to a specific temperature or temperature range. The particles should be formulated so that when incorporated into a coating the core retains such rubber-like properties and the outer shell retains its glass-like properties at all temperatures encountered by the articles of commerce in the intended field of use. Hence, for practical purposes, the monomers should be selected so that the core has a glass transition temperature that is substantially below that of the outer shell. Advantageously, the difference in glass transition temperatures between the core and the shell is at least 50° C., preferably above 100° C.

The core is formed from a major amount of an alkyl monoacrylate and a crosslinking amount of a di- or tri-functional monomer containing two or more non-conjugated terminal ethylenic groups. The monofunctional alkyl monoacrylate is preferably an ester of a $C_2$–$C_8$ monohydric alcoholic and acrylic acid, e.g., ethyl acrylate, butyl acrylate, hexyl acrylate, 2-ethyl hexyl acrylate and/or mixtures of the same. Certain other alkyl acrylates may be used when the crosslinked polymer thereof has an appropriate glass transition temperature, e.g., dodecyl methacrylate. Butyl acrylate and 2-ethyl hexyl acrylate are the most preferred of the monoacrylates for use in forming the core. The polymers produced from most methacrylates have glass transition temperatures which are to high to provide rubber-like properties at normally encountered temperatures. Hence, except for special applications, the monoacrylate component of the core will be either an ester (or esters) of acrylic acid or a mixture of a major amount of the same and a minor amount of methacrylates.

Suitable crosslinking agents include, but not by way of limitation, 1,3-butylene diacrylate, 1,3-butylene dimethacrylate, divinyl benzene, 1,6-hexamethylene diacrylate, 1,6-hexamethylene dimethacrylate, 1,1,1-trimethylol ethane triacrylate, 1,1,1-trimethylol ethane trimethacrylate, 1,1,1-trimethylol propane triacrylate, 1,1,1-trimethylol propane trimethacrylate, 1,4-cyclohexane dimethanol dimethacrylate, allyl acrylate, allyl methacrylate, methallyl acrylate, methallyl methacrylate, diallyl maleate, diallyl fumarate, and diallyl phthalate. In one embodiment, the crosslinking agent is a diester of acrylic or methacrylic acid and a $C_2$–$C_8$, preferably $C_2$–$C_6$, dihydric alcohol.

In the first stage reaction, there is preferably employed about 80 to about 98 mole percent of the monofunctional monoacrylate and about 20 to about 2 mole percent of the crosslinking agent. In the second stage reaction, the mixture of methyl methacrylate and monomers copolymerizable therewith are added before the first reaction ceases. The amounts of the second stage reactant or reactants relative to the combined first stage reactants may vary widely depending upon the physical properties desired in the coatings produced from these particles, i.e., from about 10 to about 90 to about 90 to about 10 weight percent.

The particulate materials can be prepared with a variety of different functional groups on the surfaces for reaction with thermosetting constituents. This functionality includes, but is not limited to, epoxy, carboxy, and hydroxy functionality. The outer shell is formed from methyl methacrylate and a "balance" of monomers copolymerizable therewith, at least one of which is difunctional. It is preferred to employ a minimum concentration 30 mole percent of methyl methacrylate in the monomer mix. In one such embodiment, the monomer mix used will contain about 30 to about 98 mole percent methyl methacrylate, 0 to 35 mole percent of a compound or compounds selected from monovinyl hydrocarbons and other monofunctional acrylates, and about 2 to about 45, advantageously about 5 to about 40, and preferably about 10 to about 35 mole percent of one or more difunctional monoacrylates such as glycidyl methacrylate, hydroxypropyl methacrylate, mixtures thereof, and/or other epoxide or hydroxyl bearing monoacrylates. Carboxy functionality can be afforded by adding a small amount, e.g. 1 to 10 mole percent of acrylic or methacrylic acid to the monomer mix used to form the outer shell. The difunctional monomer or monomers are preferably added with the last fraction of monomers to be introduced.

If vinyl hydrocarbons or acrylates other than methyl methacrylate are employed with the difunctional compounds, the vinyl hydrocarbons and/or acrylates so employed are preferably the monofunctional monoacrylates and/or monofunctional vinyl hydrocarbons. Suitable monofunctional monoacrylates for this purpose include esters of acrylic or methacrylic acid with a monohydric alcohol, preferably a $C_1$–$C_8$ monohydric alcohol, e.g., ethyl acrylate, butyl acrylate, butyl methacrylate, and 2-ethyl hexyl acrylate. A minor amount of higher alkyl acrylate, e.g., dodecyl methacrylate, may also be used. Suitable monovinyl hydrocarbons for this purpose include styrene, alphamethyl styrene, and vinyl toluene. Depending upon the end product desired, it will sometimes be advantageous to have a limited amount of crosslinking in the outer shell and hence to include with the methyl methacrylate and the difunctional monoacrylate a minor amount of a diacrylate or divinyl hydrocarbon, e.g., divinyl benzene or 1,3-butylene diacrylate.

The physical properties of the outer shell may be otherwise modified by replacing up to about 30 mole percent of the monofunctional monoacrylate with acrylonitrile or methacrylonitrile. Likewise, one may replace up to about 30 mole percent of the monofunctional monoacrylates heretofore mentioned with an equimolar amount of isobornyl methacrylate. In each of these embodiments, as in all others, the monomer mix used to form the outer shell will contain at least about 30 mole percent methyl methacrylate.

It is also within the scope of this invention to carry out further reactions after particle formation, as, for instance, to react a di- or tri-functional monomer with a functionality of said surface in order to alter the character or functionality of said surface, e.g., acrylic or methacrylic acid with epoxy-functional particles. In other embodiments, a carboxy or hydroxy functional particle may be reacted with an acyl halide, e.g., methacrylyl chloride.

The initial monomer charge is usually emulsified by one or more micelle-forming compounds composed of a hydrophobic part, such as a hydrocarbon group containing eight or more carbon atoms, and a hydrophilic part, such as alkali metal or ammonium carboxylate groups, phosphate or sulfate partial ester groups, sulfonate groups, and the like. Exemplary emulsifying agents include alkali metal sulfonates of styrene, naphthalene, decyl benzene, and dodecyl benzene; sodium dodecyl sulfate; sodium stearate; sodium oleate; the sodium alkyl aryl polyoxymethylene sulfates and phosphates; the ethylene oxide condensates of long chain fatty acids, alcohols, and mercaptans, and the alkali metal salts of rosin acids. These materials and the techniques of their employment in emulsion formation and maintenance are well known to the art. As they are conventional materials employed in a conventional manner, further description and explanation are unnecessary.

The polymerization initiator is composed of one or more water-soluble, free-radical-generating species such as hydrogen peroxides or the sodium, potassium, or ammonium persulfates, perborates, peracetates, percarbonates, and the like. As is well known in the art, these initiators may be associated with activating systems such as redox systems which may incorporate mild reducing agents such as sulfites and thiosulfites and redox reaction promoters such as transition metal ions.

A chain transfer agent or a mixture of chain transfer agents may be added to the reaction medium to limit the molecular weight of the polymer; such chain transfer agents are generally mercaptans such as dodecanethiol, benzenethiol, pentanethiol, and butanethiol.

Those skilled in the art will be aware that other emulsifying agents, polymerization initiators and chain transfer agents may be used when compatible with the polymerization system herein employed.

The reaction may be carried out at temperatures from about 40° C. to 80° C., or at lower temperatures, as from 0° C. to 80° C. in the case of activated systems.

Determination of the concentration of reactive epoxy groups on the shell of the graded-rubber particles can be made by the method involving addition of tetraethylammonium bromide followed by titration with perchloric acid in acetic acid using crystal violet as indicator. This method is described by R. R. Jay in Analytical Chemistry, vol. 36, p. 667 (1964). Determination of the concentration of reactive hydroxyl groups on the shell of the graded-rubber particles can be made by the well known method of analysis wherein the hydroxy groups are reacted with acetic anhydride using a pyridine catalyst. The acetic acid produced is then back titrated with sodium hydroxide. For details, see Steyermark, Quantitative Organic Analysis, pp. 302–303, published by Blakiston Company, New York, Toronto and Philadelphia (1951). For determinations of hydroxyl groups, carboxyl groups and molecular weight also see the methods described by W. R. Sorenson and T. W. Campbell in "Preparative Methods of Polymer Chemistry," Interscience Publishers, New York, N.Y., U.S.A. (1961) at p. 134.

The concentration of particulate elastomer in the coating bath and resultant electrodeposited coating can be varied over a wide range in conformance with the properties desired for the coating. In some embodiments, the coating may consist essentially of the particulate elastomer while in others the particulate elastomer may be present in a range extending from minimum modifying amounts to a major proportion of weight. Most commonly, when employed with a carrier resin, the particulate elastomer will comprise between about 5 and about 40, more commonly between about 10 and about 30, weight percent of the electrodeposited coating. The weight relationship of the glass-like outer shell to the elastomeric core can be varied but for most purposes the weight of the outer shell will not substantially exceed that of the core. In most instances, the average weights of the outer shells will be about 10 to about 60, preferably about 20 to about 50 percent of the average weight of the cores.

(II) CONDITIONS OF ELECTRODEPOSITION

It will be understood by those skilled in the art that the composition of the coating bath will depend somewhat on the organic material to be deposited and upon the dispersal assistant employed to effect ionization and dispersion. Anodic deposition of a polycarboxylic acid material from an aqueous bath containing a water-soluble amine is the mode of electrodeposition finding greatest industrial acceptance in the coating art and will be used herein for exemplary illustration.

While the concentration of the organic coating material in the bath may vary in the range of about 0.5 to about 35 weight percent, this concentration is advantageously in the range of about 3 to about 20, preferably in the range of 5 to 15, weight percent. This concentration together with the type and concentration of amino compound, particularly hydroxy amines, in the bath can be used to manipulate bath viscosity. Viscosity adjustment can also be made by using advantageously between about 0.1 and about 10%, basis weight of the ionizable organic material to be deposited, of a nonionic organic liquid compatible with the resin in the dispersion as a solubilizing assistant or dispersion modifier. Typical ones are: petroleum naphthas, specifically aliphatic, naphthenic and aromatic hydrocarbons or mixtures of same having boiling point between about 30° C. and about 240° C. and preferably between about 150° and 200° C. so that they will volatilize from the film on baking or other curing such as air curing; pine oil, glycerine, water-soluble alkoxy alkanols such as 2-butyoxy-butanol-1 and others of this type, and monoalkyl ethers of glycols such as the monobutyl ether of diethylene glycol. These alkylene oxide derivatives additionally reduce surface tension and appear to assist in lowering viscosity of baths having a high resin content.

The especially suitable water-soluble amino compounds are soluble in water at 20° C. to the extent of at least about 1% basis weight of solution and include hydroxy amines, polyamines and monoamines such as: monoethanolamine, diethanolamine, triethanolamine, N-methyl ethanolamine, N-aminoethylethanolamine, N-methyl diethanolamine, monoisopropanolamine, diisopropanolamine, triisopropanolamine, "poly-glycol amines" such as HO(C₂H₄O)₂C₃H₆NH₂, hydroxyamine, butanolamine, hexanolamine, methyldiethanolamine, octanolamine, and alkylene oxide reaction products of mono- and polyamines such as the reaction product of ethylene diamine with ethylene oxide or propylene oxide, laurylamine with ethylene oxide, etc.; ethylene diamine, diethylene triamine, triethylene tetramine, hexamethylene tetramine, tetraethylene pentamine, propylene diamine, 1,3-diaminopropane, imino-bis-propyl amine, and the like; and mono-, di- and tri-lower alkyl ($C_{1-8}$) amines such as mono-, di- and triethyl amine.

The concentration of amine employed will be dependent upon the type of amine, the acid number of the material to be deposited, and the pH at which the specific coating material is most efficiently deposited. Certain routine testing is required to determine this. The pH may be as low as 5 and as high as 10 in some instances, more commonly between about 6 and about 9. The concentration of amine will be sufficient to at least partially neutralize the free carboxyl groups of the coating material thereby converting a polycarboxylic acid resin in the bath to an anionic polyelectrolyte. In general, the concentration of the water-soluble amine compound will be about 1–10 weight percent of the weight of acid resin in the bath.

Physical dispersion of the coating materials in the bath is maintained by constant agitation.

Heat control of the bath is important within a temperature range of roughly 15° to 50° C. to prevent the generation of undesirable volatile materials and even the destabilizing or undue additional polymerization of the coating dispersion in some cases. With a bath viscosity not above about 30 times that of water, the heat control can be very simple since the efficiency of heat transfer is quite high.

An effective rate of deposition requires an impressed voltage of at least about 50 volts. Most commonly, the impressed voltage will be in the range of about 100 to about 350 volts but some compositions will permit voltages as high as 500 to 700 volts or higher. Coating time can be varied but ordinarily a time in the range of about 1 to about 3 minutes is most satisfactory.

Anionic and cationic detergents may be advantageously employed in an electrocoating bath, the choice between these depending upon whether the specific deposition process is one of anodic or cathodic deposition.

(III) CARRIER RESINS

The carrier resins advantageously have acid number in the range of about 30 to about 300, more comonly in the range of about 30 to about 120, and electrical equivalent weight above 500, preferably in the range of about 1,000 to about 20,000. The electrical equivalent weight of a given resin or resin mixture is herein defined as that amount of resin or resin mixture that will deposit per Faraday of electrical energy input under the conditions of operation (electrodeposition) employed. For this purpose, the value of one Faraday in coulombs is herein taken to be 107.88 (atomic weight of silver)÷0.001118 (grams of silver deposited by one coulomb from silver nitrate solution) or 96,493. Thus, if 0.015 gram of coating, the binder polycarboxylic acid resin moiety of which is 90% by weight and the balance of which is amino compound used to disperse it in the bath is transferred and coated on the anode per coulomb input to the process, the electrical equivalent weight of the resin is about 1303 or 0.015×0.9×107.88÷0.001118. An exemplary method of finding electrical equivalent weight of a particular polycarboxylic acid resin or resin mixture under typical processing conditions is as follows: A polycarboxylic acid resin concentrate is made up at 65.56° C. (150° F.) by thoroughly mixing 50 grams of polycarboxylic acid resin, 8 grams of distilled water and diisopropanol amine in an amount sufficient to yield resin dispersion pH of 7.8 or slightly lower after the concentrate has been reduced to 5% by weight resin concentration with additional distilled water. The concentrate is then diluted to one liter with additional distilled water to give 5% resin concentration in the resulting dispersion. (If a slight insufficiency of the amine has been used, and the dispersion pH is below 7.8, pH is brought up to 7.8 with additional diisopropanol amine.) The dispersion is poured into a metal tank, the broadest side walls of which are substantially parallel with and 2.54 cm. out from the surfaces of a thin metal panel anode. The tank is wired as a direct current cathode, and the direct current anode is a 20 gauge, 10.17 cm. (4 inches) wide, tared steel panel immersed in the bath 7.62 cm. (3.5 inches) deep. At 26.67° C. (80° F.) bath temperature direct current is impressed from anode to cathode at 100 volts for one minute from an external power source, the current measured by use of a coulometer, and the current turned off. The anode panel is removed immediately, rinsed with distilled water, baked for 20 minutes at 176.67° C. (350° F.) and weighed. All volatile material such as water and amine is presumed to be removed from this film for practical purposes by the baking operation. The difference between tared weight of the fresh panel and final weight of the baked panel divided by the coulombs of current used, times 107.88, divided by 0.001118 gives the electrical equivalent weight of the resin for purposes of this invention.

The polycarboxylic acid resin having met these functional limitations may have general chemical composition characteristic of any of the conventional paint binder resins. These include, but not by way of limitation, acrylic resins, e.g., copolymers of acrylic monomers such as acrylic and methacrylic acid and esters thereof, coupled siccative glyceride oil reacted with about 2–25%, basis the weight of the coupled oil, of a polymerizable vinyl monomer such as vinyl toluene, styrene, alpha methyl styrene, acrylonitrile or the like, extended by heating at a temperature between about 200° and about 260° C. with phenolic resin, polyester resins, epoxy resins, etc. Suitable carrier resins are illustrated in U.S. Pats. 3,230,162; 3,335,103; 3,366,563; 3,378,477; 3,403,088; 3,468,779 and many others.

(IV) REACTION PRODUCTS OF PARTICULATE ELASTOMERS

There are a vast number of materials which can be prepared from these elastomeric particles when suitable chemical functionality is provided on their surfaces. For example, the particles may be provided with hydroxy functionality by forming their outer surface by copolymerizing an ester of acrylic or methacrylic acid and a $C_1-C_8$ monohydric alcohol with a minor amount of a hydroxyalkyl acrylate, e.g., hydroxyethyl acrylate. The resultant hydroxyl groups on the particle surfaces can be reacted with a hydroxyalkyl acrylate via a conventional condensation reaction splitting off a molecule of water. This would impart alpha-beta olefinic unsaturation to the surface of the particle. Alpha-beta unsaturation can also be provided by reacting hydroxyl group with maleic anhydride or itaconic anhydride.

The particle may be provided with epoxy surface functionality by substituting glycidyl methacrylate or other epoxy acrylate for the hydroxyethyl acrylate in forming the outer surface of the particle. These epoxy groups can then be reacted with acrylic or methacrylic acid to provide the surface with alpha-beta olefinic unsaturation, or with a monocarboxy prepolymer to form a resinous material which can be electrodeposited with a carrier resin or by itself when it has the proper functionality, i.e., ionizable groups.

The particle may be provided with carboxy functionality by substituting acrylic or methacrylic acid for the hydroxyethyl acrylate or epoxy acrylate in forming the outer surface of the particles. The carboxyl groups can then be reacted with glycidyl methacrylate to provide the surface with alpha-beta olefinic unsaturation, or with a monoepoxy prepolymer to form a resinous material which can be electrodeposited with a carrier resin, or by itself when it has the proper functionality, i.e., ionizable groups.

A monoepoxy, copolymer of vinyl monomers which is suitable for the use above referred to has average molecular weight in the range of about 1,000 to about 8,000, preferably about 1,500 to about 5,000. These copolymers consist essentially of carbon, hydrogen and oxygen. The preferred constituent monomers are esters of acrylic or methacrylic acid and a $C_1$–$C_8$ monohydric alcohol, and an epoxyacrylate, e.g., glycidyl methacrylate. Other vinyl monomers, preferably in minor proprotion, can also be used.

The monoepoxy vinyl copolymer can be prepared by conventional methods of preparing vinyl monomer-comprising copolymers employing a free-radical initiator, e.g., benzoyl peroxide, dibutyl peroxide, 2,2'- azobis-(2-methylpropionitrile), hereinafter termed AIBN, etc., and a chain transfer agent for limiting molecular weight, e.g. dodecane thiol, benzene thiol, pentene thiol, butane, thiol, etc. The concentration of initiator in the charge is advantageously about 3–4 weight percent. The concentration of chain transfer agent in the charge is advantageously about 2–3 weight percent. To provide the epoxy functionality, one of the constituent monomers will be an epoxyacrylate, e.g., glycidyl methacrylate or glycidyl acrylate. The concentration of this component will vary from about 3 mole percent in the case of the higher molecular weights to about 7 mole percent in the case of the lower molecular weights. To provide the desired alpha-beta olefinic unsaturation, the reaction product of the epoxy-functional vinyl copolymer and the carboxy-functional graded-rubber can be reacted with acrylyl chloride or methacrylyl chloride. This reaction is effected with the hydroxyl group resulting from the opening of the epoxide structure when the copolymer is reacted with the graded-rubber.

Under these conditions using these materials, a minor amount of the copolymer will be produced having two epoxide groups per molecule as well as a minor amount of copolymer having no free epoxide groups. The production of these materials is minimized by the use of the chain transfer agent and liberal use of initiator above described, by the proper proportioning of constituent monomers above described, and by intimate mixing of the reactants during copolymer formation. A reaction product containing less than about 30 mole percent of the diepoxy copolymer and less than 25 mole percent of copolymer without epoxide groups is suitable for use in this invention. Preferably, the monoepoxy terminated copolymer comprises in excess of 88 mole percent of the reaction product.

An alpha-beta olefinically unsaturated monocarboxylic acid terminated polyester which can be used in the above referred to embodiment will advantageously have average molecular weight in the range of about 1,000 to about 5,000, commonly in the range of about 1,500 to about 3,500. The polyester advantageously has about 0.5 to about 5, preferably about 0.7 to about 3.5 units of alpha-beta olefinic unsaturation per 1,000 units molecular weight.

These polyesters consist essentially of carbon, hydrogen and oxygen and can be prepared by conventional methods for producing polyesters and using as constituent monomers a monocarboxylic acid, maleic anhydride (or dicarboxylic acid or anhydride of equivalent olefinic unsaturation), a second anhydride wherein the anhydride group is supported by a ring structure, e.g., phthalic anhydride and a polyhydric alcohol, e.g., propylene glycol, neopentyl glycol, etc.

The alpha-beta olefinic unsaturation of the polyester employed as a reactant in preparing the rubber-comprising resins is derived from an alpha-beta olefinically unsaturated dicarboxylic acid and/or anhydride constituent monomer, e.g., maleic, fumaric, itaconic, chloromaleic, dichloromaleic, etc. By means known to the art, the polymer preparation can be rearranged to obtain alpha-beta olefinic unsatuation from an acrylic constituent monomer.

The anhydride wherein the anhydride group is attached to a ring structure (aromatic or aliphatic) is selected from anhydrides that will not provide additional alpha-beta olefinic unsaturation units and the relative quantities of the two acids and/or anhydrides are adjusted to provide the desired concentration of such unsaturation. Suitable anhydrides for this purpose include, but not by way of limitation, phthalic, tetrahydrophthalic, cyclohexane dicarboxylic acid anhydride, methyl bicyclo[2.2.1]hept-5,6-ene-2,3-dicarboxylic anhydride, etc.

The polyhydric alcohol is preferably a diol consisting essentially of carbon, hydrogen and oxygen. Triols and other multihydric alcohols, can be used but it is advisable to employ such alcohols in minor amounts with a diol, if they are used at all. Suitable diols include, but not by way of limitation, ethylene glycol, propylene glycol, 1,3-butylene glycol, 2-butene-1,4 diol, 1,4-butane glycol, 1,6-hexamethylene glycol, dimethylol benzene, dihydroxy ethyl benzenes, etc.

This invention will be more fully understood from the following illustrative examples.

EXAMPLE 1

Step I

Carboxy-functional, graded-rubber particles are prepared in aqueous medium using the following procedure:

| Materials | Moles | Parts by weight |
|---|---|---|
| 1. Deionized water | | 375 |
| 2. Surfactant [1] | | 5.1 |
| 3. Butyl acrylate | 95 | 175 |
| 4. 1,3-butylene dimethacrylate | 5 | 20 |
| 5. Methacrylic acid | | 5 |
| 6. Ammonium persulfate | | 1 |
| 7. Sodium formaldehyde sulfoxylate ($NaHSO_4.CH_2O.CH_2O$) | | 0.7 |
| 8. t-Butylhydroperoxide (70%), drops | | 5 |

[1] Anionic phosphate ester type.

In a reaction flask dissolve ¾ of surfactant in water and adjust pH to 90 by adding 50% sodium hydroxide solution. Add initiators (items 5, 6 and 7) and one half of the monomers and stir for 15 minutes with flow of nitrogen. The mix is heated to 45° C. When the temperature begins to rise by reaction isotherm, the other half of the monomers and the remainder of the surfactant is begun. The temperature is maintained at 65° C. and the addition is completed in 45 minutes. The pH is adjusted to 9.0 by adding aqueous ammonia and the following materials are added to form the shell:

| Materials | Moles | Parts by weight |
|---|---|---|
| Methyl methacrylate | 90 | 52 |
| Methacrylic acid | 10 | 8.0 |
| Surfactant [1] | | 0.2 |
| Pentane thiol | | 1.5 |
| t-Butylhydroperoxide, drops | | 3 |

[1] Same as used in formation of cores.

The addition is completed in 30 minutes while maintaining the temperature at 65° C. The emulsion is allowed to cool.

Step II

A hydroxy and carboxy functional, synthetic polycarboxylic acid resin is prepared in the following manner: To 300 grams of 2-butoxy ethanol maintained at 120° C. during a 4 hour period there are slowly added 52 grams of hydroxyethyl methacrylate, 26 grams of methacrylic acid, 330 grams of methyl methacrylate, 284 grams of butyl methacrylate, and 14.5 grams of benzoyl peroxide. The temperature is held at 120° C. for an additional 2 hours in an agitate reactor equipped with a reflux condenser. A nitrogen atmosphere is provided in the reactor. The resulting resin is cooled to 70° C. and 60 grams of diisopropanol amine in 1000 grams of water is added with vigorous stirring. An additional 9000 grams of water are then added.

Step III

The carboxy rubber latex prepared in Step I is slowly added with stirring to the resin prepared in Step II. The pH of this bath is adjusted to about 8.1 by using diisopropanol amine or additional acid resin prepared in accordance with Step II as needed.

Step IV

The electrodeposition of the combined products of Steps I and II is carried out in the following manner: The electrodeposition or electropainting is conducted in a metal tank equipped with an agitator. The tank is wired as a cathode and a series of phosphate treated thin sheet steel panels 25 cm. wide by 30 cm. dipped length are used as anodes for coating. Direct current, about 25 amperes per square meter of immersed panel surface, is imposed on the tank and anode panel from an external circuit using a maximum impressed potential of about 100 volts for 1 minute. The acrylic rubber particles along with the carrier resin are deposited on the panels (anodes). The electrodeposition is carried out at room temperature, i.e., about 25° C.

The coating on the panels are oven cured for 15 minutes at 177° C.

EXAMPLE 2

Step I

Hydroxy-functional, graded-rubber particles are prepared in the following manner: To 1,000 parts by weight water which has been boiled and cooled to room temperature under a nitrogen atmosphere are added 2.86 parts by weight sodium dodecyl sulfate dissolved in 35.7 parts by weight water and about ⅙ of a monomer mixture consisting of 180 parts by weight 2-ethyl hexyl acrylate and 20 parts by weight divinyl benzene. The mixture is stirred to establish dispersion of the monomers. To the stirred mixture are added 3.16 parts by weight potassium persulfate dissolved in 71.4 parts by weight water and this mixture is heated to 45° C. After about 10 minutes, addition of the remainder of the first monomer mixture is begun at a rate such that the temperature of the reaction mixture is maintained at 47° to 49° C. The last half of the first monomer mixture added simultaneously with 2.86 parts by weight of sodium dodecyl sulfate dissolved in 35.7 parts by weight water. Addition of the first monomer mixture requires about 45 minutes. The reaction mixture is maintained at 47° to 49° C. for 35 minutes prior to beginning simultaneous dropwise addition of 380 parts by weight methyl methacrylate, 50 parts by weight butyl methacrylate, 40 parts by weight hydroxyethyl methacrylate, and 5.72 parts by weight sodium dodecyl sulfate dissolved in 36 parts by weight water. This addition, which requires about 40 minutes, is carried out at such a rate that the temperature of the reaction mixture is maintained at 47° to 49° C. for an additional two hours. The resulting latex is cooled and neutralized with aqueous ammonia. The overall conversion of monomers is about 98%.

The resultant particles are coagulated in 4 volumes methyl alcohol. The coagulum is isolated by gentle centrifugation.

Step II

The coagulum is dispersed with vigorous stirring in benzene to a concentration of 20 percent by weight solids. To this dispersion is added 29 parts by weight of maleic anhydride dissolved in benzene and 5 parts by weight triethyl amine. The mixture is heated at reflux for 4 hours. The benzene is distilled off and continuously replaced by one-half the volume of 2-butoxy ethanol.

Step III

A polycarboxylic acid carrier resin is prepared in the following manner: An extended coupled glyceride drying oil carrier resin is made by reacting in an agitator tank 1,000 grams of alkali refined linseed oil and 245 grams of maleic anhydride by heating at 232° C. under nitrogen atmosphere for 3 hours or until acid value reaches in the range of 80–90.

This reaction product is cooled to 90° C. and 250 grams of triethylene diamine in 1,000 grams of water. The mixture is agitated for 10 minutes and 1,000 grams of water added slowly and with agitation.

Step IV

To the above dispersion are added 200 grams of pigmentary titanium dioxide and 50 grams of lead chromate. The mixture is then passed through a sand grinding mill for dispersion of pigments.

Step V

The above dispersion is diluted by adding 6,000 grams of water. To this is added slowly the dispersion of rubber particles in 2-butoxyethanol prepared above. The pH is adjusted to 8.1 by adding diisopropanolamine during the addition.

Step VI

A paint film is electrodeposited from this bath upon zinc phosphate treated steel panels using the procedure of Example 1 except that impressed maximum voltages of 50, 100, and 150 volts are employed the resultant coatings are cured at 180° C. for 20 minutes.

EXAMPLE 3

Graded-rubber particles having hydroxy functionality are prepared in accordance with the procedure employed in Example 2. The latex is coagulated, dried and the resultant cake is ground to fine powder. Six hundred and seventy (670) grams of this powder, 180 grams of pigmentary titanium dioxide, and 40 grams lead chromate are added to 2500 grams of polycarboxylic acid carrier resin prepared in accordance with the procedure of Example 2 in 7,000 grams of water containing 600 grams of diisopropanol amine. The mixture is passed through a sand grinding mill to achieve dispersion. The dispersion is diluted with water and the pH is adjusted to 8.1 by adding diisopropanol amine. Electrodeposition of coatings is carried out from this dispersion following the procedure of Example 1. The resultant films are heat cured at 180° C. for 20 minutes.

EXAMPLE 4

The procedure of Example 3 is repeated except for the difference that graded-rubber particles having alpha-beta olefinic unsaturation are substituted for the hydroxy-functional rubber latex of Example 3. These alpha-beta olefinically unsaturated graded-rubber particles are prepared in the following manner: To 1,000 parts by weight water which has been boiled and cooled to room temperature under a nitrogen atmosphere are added 2.86 parts by weight sodium dodecyl sulfate dissolved in 35.7 parts by weight water and about ⅙ of a monomer mixture consisting of 348 parts by weight butyl acrylate and 32.3 parts by weight 1,3-butylene dimethacrylate. The mixture is stirred to establish dispersion of the monomers. To the stirred mixture are added 3.14 parts by weight potassium persulfate dissolved in 71.4 parts by weight water. The mixture is heated to 45° C. After about 10 minutes, addition of the remainder of the first monomer mixture is begun at a rate such that the temperature of the reaction mixture is maintained at 47° to 49° C. The last half of the first monomer mixture is added simultaneously with 2.86 parts by weight of sodium dodecyl sulfate dissolved in 35.7 parts by weight water. Addition of the first monomer mixture requires about 45 minutes. The reaction mixture is maintained at 47° to 49° C. for 35 minutes prior to beginning simultaneous dropwise addition of (1) a mixture of 236 parts by weight methyl methacrylate, 143.4 parts by weight glycidyl methacrylate, and 2.57 parts by weight 1-dodecanethiol, and (2) a solution of 5.72 parts by weight sodium dodecyl sulfate in 35.7 parts by weight water. This addition, which requires about 40 minutes, is carried out at such a rate that the temperature of the reaction mixture is maintained at 47° to 49° C. Following this addition, the mixture is maintained at 47° to 49° C. for an additional two hours. The resultant latex is cooled to room temperature. The overall conversion of monomers is about 90%. The average size of these particles is in the range of about 0.1 to about 0.2 micron.

This latex is coagulated by adding one volume of latex to approximately 4 volumes of methyl alcohol to which has been added 0.001 volume concentrated hydrochloric acid. The coagulum is isolated by filtration, washed with several volumes of methyl alcohol, and with water, and is dried in vacuo to yield a white powder. Twenty parts by weight of this powder are dispersed in 200 parts by weight benzene. To this dispersion is added methacrylic acid in an amount providing about the carboxyl group per each epoxy group in the outer shells of the rubber particles and a catalytic amount (0.1 part by weight based on methacrylate acid) benzyl triethyl ammonium chloride. The dispersion is heated until the reaction between the methacrylic acid and the epoxy groups on the graded elastomeric particles is at least 50% complete. The benzene is removed by distillation at reduced pressure.

EXAMPLE 5

Step I

Carboxy-functional, graded-rubber particles are prepared using the same procedure employed in Example 1 except for the difference that the cores are formed from 90 molar parts ethyl acrylate and 10 molar parts 1,3-butylene dimethacrylate and the outer shells are formed from 180 molar parts methyl methacrylate and 20 molar parts methacrylic acid. After coagulation and separation from the reaction medium, the particulate rubber is dispersed in an equal weight of benzene. This dispersion is then dispersed in 10 times its weight of isooctane.

Step II

To this dispersion is added a monoepoxy copolymer of vinyl monomers employed in an amount such as to provide one epoxy group for each two carboxy groups in the rubber particles, and glycidyl methacrylate in an amount to provide one epoxy group per each two remaining carboxy groups. The acid number of the final product can be adjusted over a wide range by using varying amounts of the monoepoxy copolymer. The monoepoxy copolymer is prepared in the following manner.

| Materials: | Parts by weight |
|---|---|
| Glycidyl methacrylate | 142 |
| Methyl methacrylate | 3,000 |
| AIBN [1] | 80 |
| Toluene | 3,000 |

[1] 2-azobis (2-methyl propionitrile).

Procedure.—In a reaction flask fitted with condenser, nitrogen inlet, stirrer and dropping funnel is placed the toluene where it is heated to reflux. The mixture of the monomers and initiators is then added at a constant rate over a period of 4 hours. One part by weight AIBN in 100 parts by weight toluene is then added over a period of 15 minutes and refluxing continued for one additional hour.

The polymer is isolated by evaporation of toluene or by coagulation in a large volume of hexane. The polymer has a number average molecular weight of about 3,200 and contains an average of about one epoxy group per molecule.

To the dispersion of rubber particles and monoepoxy copolymer there is added 0.02 part by weight of pyridine and the temperature is maintained at 80° C. for 4 hours.

Step III

The organic reaction product of monoepoxy copolymer and carboxy-functional, graded-rubber particles is recovered from the reaction medium. This product and a quantity of diisopropanolamine sufficient to effect a pH of about 8.3 are dispersed in water to form a bath having about 7 weight percent solids. This material is electrodeposited from this bath upon metal substrates as in the preceding examples. The resultant film is cured by ionizing radiation in the form of an electron beam. The conditions of irradiation are as follows:

| | |
|---|---|
| Potential, kv. | 275 |
| Current, milliamperes | 25 |
| Distance, emitter to workpiece, inches | 10 |
| Atmosphere, nitrogen | |
| Dose, Mrad. | 10–15 |

EXAMPLE 6

Step I

Hydroxy-functional, graded-rubber particles are prepared in accordance with the procedure outlined in Example 2 with the exceptions that the cores are formed from 85 parts by weight of ethyl acrylate and 20 parts by weight of 1,3-butylene diacrylate and the outer shell is formed from 90 parts by weight of styrene and 15 parts by weight hydroxyethyl methacrylate. The particles are coagulated, washed in methanol and dried at 50° C. under vacuum.

Step II

The above described rubber particles in the amount of 210 parts by weight are dispersed in 800 parts by weight of alkali refined linseed oil and to this is added 200 parts by weight of maleic anhydride by heating at 200° C. for 3 hours. Lower temperature can be used if a catalyst such as 0.5 weight percent of dibutyl tin oxide is used.

The reaction product is cooled to 90° C. and with triethylamine in the amount of 200 parts by weight is dispersed in 2,000 parts by weight water by slow addition and agitation. The pH is adjusted to a pH of about 8.1 by addition of more amine or more of the acidic reaction product as necessary.

Electrodeposition is carried out on metal panels in the previous examples using this dispersion as the electrolyte of the electrodeposition cell.

EXAMPLE 7

Particulate elastomers in the form of a styrene-butadiene rubber are prepared in the following manner.

| Materials: | Parts by weight |
|---|---|
| Butadiene | 75 |
| Styrene | 25 |
| Dodecyl mercaptan | 0.5 |
| Potassium persulfate | 0.3 |
| Soap flakes | 5 |
| Water (freshly boiled) | 180 |

The constituents are charged in a pressure vessel provided with stirring and temperature control devices. After closing the vessel, the temperature is raised to 50° C. This temperature is maintained for 12 hours and then raised to 70° C. and maintained for an additional 12 hours. The reaction mix is then cooled to 25° C. and 0.1 weight percent phenyl-β-naphthyl amine (an antioxidant) added. The latex is then coagulated by adding 10 grams of sodium chloride and 5 ml. of dilute sulfuric acid. The crosslinked rubber thus obtained is washed with water and dried.

Step II

An extended coupled glyceride drying oil paint binder is made by reacting in an agitator tank 8,467 parts by weight of alkali-refined linseed oil and 2,025 parts by weight of maleic anhydride (heated together at 232.2° C. for about three hours until an acid value of 80–90 results), then cooling this intermediate to 157.2° C., adding 1,789 parts of vinyl toluene containing 48 parts of ditertiary butyl peroxide and reacting at 218.3° C. for about an hour. The resulting vinyl toluenated material is then cooled to 157.2° C. and 5,294 parts of non-heat reactive, thermoplastic, oil-soluble phenolic resin is added, the temperature raised to 232.2° C. and the mixture held one hour. The phenolic resin is a solid lump resin having softening point of 120–150° C., specific gravity of 1.03–1.05 at 20° C., and has been stripped to get out excess phenol and low molecular weight materials. It is a condensation product of about equimolar quantities of paratertiary butyl phenol and formaldehyde. The electrical equivalent weight of the resulting acid resin as extended is about 1,640, and it has acid number of 65.

The material then is cooled to 93.3° C., and 1,140 parts are taken for forming a paint dispersion. To these 1,140 parts, 100 parts of water are added, then 13.6 parts of triethylamine, the mixture agitated for a few minutes, then 74 more parts of water and 92.5 parts diisopropanol amine added. This mixture is further reduced with 1,825 parts water and 32.5 parts diethylene triamine while agitation is continued.

To this paint dispersion there is added 50 parts of a treating mixture of mineral spirits, a light hydrocarbon liquid having A.P.I. gravity of 45–49.5, specific gravity at 15.6° C. of 0.78–0.80, flash point (Cleveland Open Cup) between 37.8–46° C., a negative doctor test and no acidity, 12 parts of a wetting agent (the oleic ester of sarcosine, having a maximum of 2% free fatty acid, a specific gravity of 0.948, color on the Gardner scale of 6, and a molecular weight of 340–350). This material is compatible with the paint dispersion; no distinct hydrocarbon phase results either at this time, even though a substantial amount of hydrocarbon (predominantly aliphatic) has been used, nor after further addition of the pigment grind and addition of extra water to make the initial painting bath.

A pigment grind is made from 123 parts of vinyl-toluenated, maleic-coupled linseed oil made in the same manner as the resin hereinabove shown in this example (except that the resulting polycarboxylic acid resin is not extended with the phenolic resin), 8.4 parts of diisopropanol amine, 0.7 part of an antiform agent (a ditertiary acetylenic glycol with methyl and isopropyl substitution on the tertiary carbon atoms), 233 parts of fine kaolin clay, 155 parts of pigmentary titanium dioxide, 7.8 parts of fine lead chromate, 15.5 parts of fine red iron oxide, 16.9 parts of carbon black, and 201 parts of water. The resulting pigment grind and rubber particles of Step I in an amount comprising 5 weight percent of the synthetic polycarboxylic acid resin in the aforementioned paint dispersion are then blended with the foregoing paint dispersion and treating mixture to make a concentrated paint. The resulting paint is reduced further with water in the ratio of one part of the resulting paint per 5 parts of water to make an initial paint bath for electropainting operations.

Step III

The painting operation is conducted in a metal tank equipped with an agitator. The tank is wired as a cathode, and a series of phosphate-treated thin sheet steel panels 22.85 cm. wide by 26.64 cm. dipped length are used as anodes for coating. The bath volume is 2,500 cc. Direct current is imposed on the tank cathode and an immersed panel anode from an external circuit. The initial pH of the bath is 8.1. The voltage across the bath for a particular panel is run up from zero to a maximum of 200 volts during a particular panel-coating operation to deposit a film approximately 25.4 microns thick before electrical resistance of the film virtually stops deposition at the maximum voltage used. The paint bath temperature during the operation is between 35° and 37.8° C., and the coating time of a particular panel is 53 seconds as it is being immersed, 74 seconds as it is fully immersed, and 53 seconds as it is being withdrawn. Before baking, the electrodeposited paint film is water resistant, slightly tacky, and tenaciously adhering. After baking for 15–20 minutes at 176.7° C. the film cures to exhibit an excellent, pore-free durable coating.

EXAMPLE 8

The procedure of Example 7 is repeated with the sole difference that the rubber particles of Step I in the amount of 10 weight percent of the synthetic polycarboxylic acid resin are employed in lieu of the 5 weight percent employed in the Example 7.

EXAMPLE 9

Step I

Epoxy-functional graded-rubber particles are prepared following the procedure used to prepare the hydroxy-functional, graded-rubber particles in Example 2 except for the difference that an equimolar amount of glycidyl methacrylate is substituted for the hydroxyethyl methacrylate used in Example 2.

Step II

An acrylic resin is made by slowly adding a mixture of 60 parts of butyl acrylate, 25 parts styrene, 15 parts of methacrylic acid, 1 part of t-butyl perbenzoate, and 1 part of benzoyl peroxide into 34.7 parts of 2-butyoxyethanol maintained at 157.2–160° C. during a 2½ hour period and is held for an additional hour at this temperature using an agitated reactor equipped with a reflux condenser. The resulting resin is cooled to 137.8° C. and further reacted for ⅓ hour at 154.4° C. with 10 parts of tris hydroxyl methyl amino methane to enhance its apparent water solubility. The resulting resin dispersion has acid number of 57.6 and 75.6% resin solids content.

Step III

The epoxy-functional, graded-rubber particles of Step I in the amount of 10 parts by weight and the carboxy-functional, acrylic resin of Step II in the amount of 120 parts by weight are blended together.

Step IV

The bath for electrocoating is prepared by first stirring the mixture of Step III, 10 parts of a water soluble amino compound mixture (composed of 86 parts diisopropanol amine, 25 parts diethylene triamine, and 86 parts water), 30 parts of a pigment grind (composed of 16 parts of titanium dioxide, 8 parts of fine kaolin clay, and 6 parts of an alkyd resin, and 47 parts of water to form a concentrate.

The alkyd resin referred to in the preceding paragraph is prepared by heating 948 parts of tall oil fatty acids containing 97.6% tall oil fatty acids, 1.2% rosin acids and 1.2% unsaponifiable content, having Acid No. of 197, Sap. No. of 198, and an Iodine Value of 128, and 155 parts of maleic anhydride at 232.2° C. for one hour, cooling the mixture to 104.4° C., adding 503 parts of technical grade pentaerythritol, 394 parts of phthalic anhydride, and 30 parts of xylol (for water entraining solvent), then refluxing the batch at 171.1° C. with water of reaction separation until an acid number of 102.6 is reached on the resulting resin.

The bath for electrocoating is prepared by stirring the aforementioned concentrate with 10 additional parts of the aforementioned amino compound mixture and 780 additional parts of water to make up an agitated bath having about 13 weight percent solids and pH of about 7.5.

Panels are coated by electrodepositing resin and particulate rubber from this bath using an impressed maximum potential of 250 volts. The coated panels are oven dried for 20 minutes at 176.7° C.

EXAMPLE 10

Step I

Epoxy-functional graded-rubber particles are prepared following the procedure used to prepare the hydroxy-functional, graded-rubber particles in Example 2 except for the difference that an equimolar amount of glycidyl methacrylate is substituted for the hydroxyethyl methacrylate used in Example 2.

Step II

An acrylic resin is prepared in the following manner: A reaction vessel containing 665 parts of deionized water and 1 part of ammonium persulfate is heated to 90° C. Over a period of about 2 hours there is added to the vessel a solution of 4 parts of ammonium persulfate in 500 parts of deionized water, along with a mixture of the following:

| | Parts by weight |
|---|---|
| Ethyl acrylate | 125 |
| Methyl methacrylate | 150 |
| Acrylonitrile | 150 |
| 2-hydroxypropyl methacrylate | 50 |
| Methacrylic acid | 25 |
| Tertiary-dodecyl mercaptan | 15 |

After heating an additional 1½ hours, the mixture is cooled and sufficient deionized water and diethylamine are added to make the total solids content 25.5 percent and the pH 7.2. Nine hundred thirty-six (936) parts of this product are thoroughly mixed with 102 parts of hexakis (methoxymethyl) melamine and 150 parts of the epoxy-functional, graded-rubber particles of Step I and then there are added slowly with agitation 2368 parts of deionized water and sufficient diethylamine to make the pH 8.5.

Step III

Steel panels are coated by electrodepositing resin and rubber particles from this bath using an impressed maximum potential of 150 volts. The panels are oven dried for 20 minutes at 177° C.

EXAMPLE 11

An electrodeposition bath is prepared by dispersing carboxy-functional, graded-rubber particles in an aqueous dispersion of water and diisopropanol amine to a concentration of about 7 weight percent solids. The pH of the bath is adjusted to about 8.5 by addition of more amine or more of the acidic rubber particles while maintaining the concentration of solids between about 6 and about 8 weight percent. This dispersion is continuously agitated and employed as the electrolyte of an electrodeposition cell.

EXAMPLE 12

Cathodically depositable coating material is prepared in the following manner:

Step I

Graded-rubber particles are prepared by the following procedure: To 1,000 grams water which has been boiled and cooled to room temperature under a nitrogen atmosphere are added 2.86 grams sodium dodecyl sulfate dissolved in 35.7 grams water and about ⅛ of a monomer mixture consisting of 175 grams butyl acrylate and 25 grams 1,3-butylene dimethacrylate. The mixture is stirred to establish dispersion of the monomers. To the stirred mixture are added 3.16 grams potassium persulfate dissolved in 71.4 grams water and this mixture is heated to 45° C. The reaction mixture is maintained at 47° to 49° C. for 35 minutes prior to beginning simultaneous dropwise addition of 300 grams methyl methacrylate, 31 grams of 2 (1-aziridinyl) ethyl methacrylate, and 5.72 grams water. This addition, which requires about 40 minutes, is carried out at such a rate that the temperature of the reaction mixture is maintained at 47° to 49° C. for an additional two hours. The resulting latex is coagulated by gentle centrifugation, washed by methanol and dried.

Step II

A carrier resin is prepared by polymerization of the below listed materials.

| Materials: | Grams |
|---|---|
| Methyl methacrylate | 600 |
| Butyl methacrylate | 400 |
| Dimethylaminoethyl methacrylate | 100 |
| Di-t-butyl peroxide | 20 |

Procedure.—The above listed items are slowly added to 1,500 grams of dioxane stirred and maintained under nitrogen atmosphere at 100° C. After 6 hours, when the polymerization is complete, the rubber particles prepared in Step I are added and dispersed by rapid stirring.

The dispersion is slowly added to 16 kilograms of water containing 320 grams of phosphoric acid and 100 grams of sodium dihydrogen phosphate. The stirring is continued and the pH is adjusted to 4.5. The resin and rubber particles are electrodeposited from the dispersion on a cathode using an impressed potential of 200 volts. The coated cathode is baked at 150° C. for 25 minutes.

EXAMPLE 13

An electrodeposition bath is prepared by dispersing the graded-rubber particles of Step I of Example 12 in an aqueous dispersion of water, phosphoric acid and sodium dihydrogen phosphate to a concentration of about 7 weight percent solids. The phosphoric acid and the sodium dihydrogen phosphate are employed in a 3.2 to 1 weight ratio and quantitatively in amounts sufficient to provide the dispersion with a pH of about 4.5. This dispersion is continuously agitated and employed as the electrolyte of an electrodeposition cell.

EXAMPLE 14

An electrodeposition bath is prepared by dispersing in water carboxy-functional, graded-rubber particles and diisopropanol amine to provide a pH of about 8.1. The carboxy-functional, graded-rubber particles are prepared from hydroxy-functional, graded-rubber particles in accordance with the procedure described in Example 2 and trimellitic anhydride. This reaction is carried out using about one molecule of trimellitic anhydride per each hydroxyl group on the graded-rubber particles or one molar amount of trimellitic anhydride per 1 molar amount reactive hydroxyl. The rubber particles are dispersed in an aromatic hydrocarbon solvent having a boiling range of 369° to 406° F. The trimellitic anhydride and 0.001 mole triethylene amine are slowly added to the solvent with constant stirring while maintaining the temperature of the reaction mixture at 100° C. until the acid number is about 100. The reaction mixture is mixed 120 grams of diisopropanol amine and 1,000 grams of water. To this is added water in an amount such as to provide a paint solid concentration of about 10 weight percent. Additional diisopropanol amine is added in an amount sufficient to adjust the pH to about 8.1.

This bath is employed as the electrolyte of an electrodeposition cell and electrodeposition of the acidic particles effected upon a metal anode using a maximum impressed potential of 180 volts.

EXAMPLE 15

An anodically depositable coating material is prepared in the following manner:

Step I

Carboxy-functional, graded-rubber particles are prepared using the procedure employed in Step I of Example 1.

Step II

A carrier resin is prepared in the following manner: An epoxy ester of tall oil fatty acids is made by reacting 700 parts of the condensation product of epichlorohydrin and bisphenol A having an epoxide equivalent of 180 to 200 (Epon 828) with 2,240 parts of tall oil fatty acids in the presence of 100 parts of high-boiling aromatic hydrocarbon solvent. The mixture is heated with agitation to 240° C. and held at that temperature for about 5 hours, at which time it has an acid value of about 22.7. There are then 700 parts of maleic anhydride and this mixture is reacted at 225–250° C. for 1½ hours and then sparged with inert gas for 5 minutes. A solution of 360 parts of morpholine and 7,716 parts of water is then mixed with 2,670 parts of the hot resin. After an additional 42 parts of morpholine are added, the product is about 43 percent neutralized and has a pH of 6.5 and a solids content of 25 percent.

A pigment past is then made by grinding the following material for 24 hours in a steel ball mill:

| | Parts by weight |
|---|---|
| Vehicle (resin) made above (35 percent solids) | 1,125 |
| Titanium dioxide | 1,252 |
| Barytes | 1,669 |
| Magnesium silicate | 169 |
| Strontium chromate | 183 |
| Carbon black | 69 |
| Bentonite water-dispersible clay thickner | 16.5 |
| Deionized water | 825 |

The paste thus produced is of number 7 Hegman grind and is comprised of 63.1 percent pigment solids and 8.0 percent vehicle solids.

A coating composition is produced by mixing 2898 parts by weight of the vehicle of this example (35 percent solids), 112.6 parts by weight of the carboxy-functional, graded-rubber particles of Step I, and 273.5 parts by weight of the above pigment paste along with 1,000 parts of deionized water. Sufficient deionized water is then added to give a total solids content of 6 weight percent.

This dispersion is employed as the electrolyte of an electrodeposition cell and paint electrodeposited therefrom upon steel panels using in separate tests maximum impressed potentials of 50, 100, 150, 200, 250, 300 and 500 volts.

EXAMPLE 16

The procedure of Example 15 is repeated except for the difference that the electrodeposition bath is prepared by mixing 3,059 parts by weight of the vehicle (35 percent soilds), 56.3 parts by weight of the carboxy-functional, graded-rubber particles of Step I, and 273.5 parts by weight of the pigment paste along with 1,000 parts by weight of deionized water. Sufficient deionized water is then added to give a total solids content of 12 percent.

EXAMPLE 17

The procedure of Example 15 is repeated except for the difference that the electrodeposition bath is prepared by mixing 2576 parts by weight of the vehicle (35 percent solids), 225.2 parts by weight of the carboxy-functional, graded-rubber particles of Step I, and 273.5 parts by weight of the pigment paste along with 1,000 parts by weight of deionized water. Sufficient deionized water is then added to give a total solids content of 5 weight percent.

EXAMPLE 18

The procedure of Example 2 is repeated except for the difference that the hydroxy-functional, rubber particles employed are prepared in an organic medium using the following procedure:

(A) A mixture is formed from the following materials.

| Materials: | Grams |
|---|---|
| Ethyl acrylate | 60.0 |
| Hydroxyethyl methacrylate | 20.0 |
| 1,3-butylene dimethacrylate | 20.0 |
| Dispersion agent [1] | 3.0 |
| AIBN [2] | 0.5 |

[1] An amphiphatic copolymer (1 portion soluble in the acrylic monomers and the other portion soluble in the solvent, e.g., dodecane) is prepared by reacting 12-hydroxystearic acid (300 g.) in the presence of stearyl alcohol (310 g.) and p-toluene sulfonic acid (6 g.) at 180°–190° C. until the acid value is less than 1 mg. KOH/g. The product is then reacted with methacrylic anhydride (170 g.). The resulting material is then copolymerized with an equimolar amount of methyl methacrylate using AIBN initiator (9 g.) and butyl acetate solvent. This method of producing this dispersing agent is described in detail by K. E. J. Barratt and H. R. Thomas in Journal of Polymer Science, part A1, vol. 7, 2625 (1969). Other dispersing agents which are effective for stabilizing suspensions in hydrocarbon liquids may be used in place of the above described materials.
[2] 2,2′ azobis-(2-methylpropionitrile).

(B) The mixture of the above listed materials is added to 1,000 grams n-dodecane under nitrogen. The reaction mixture is warmed to 40° C. When the exotherm starts the temperature is allowed to rise to 80° C. The temperature is maintained at 80° C. for 30 minutes. The elastomeric particles are separated from the reaction medium by distillation at reduced pressure. The recovered particles are washed with methanol and dried.

EXAMPLE 19

The procedures of Examples 1 and 2 are repeated with the difference that in preparing the cores of the graded-rubber particles are equimolar amount of 1,3-butylene diacrylate is substituted for the 1,3-butylene dimethacrylate.

EXAMPLE 20

The procedures of Examples 1 and 2 are repeated with the difference that in preparing the cores of the graded-rubber particles an equifunctional amount of 1,1,1-trimethylolethane triacrylate is substituted for the 1,3-butylene dimethacrylate.

EXAMPLE 21

The procedures of Examples 1 and 2 are repeated with the difference that in preparing the cores of the graded-rubber particles an equimolar amount of 1,4-dimethylolcyclohexane dimethacrylate is substituted for the 1,3-butylene dimethacrylate.

EXAMPLE 22

The procedure of Example 1 is repeated with the difference that in preparing the outer shells of the graded-rubber particles 70 mole percent of the methyl methacrylate is replaced with 10 mole percent ethyl acrylate, 10 mole percent butyl acrylate, 10 mole percent butyl methacrylate, 10 mole percent 2-ethyl hexyl acrylate, 5 mole percent styrene, 5 mole percent alpha methyl styrene, 5 mole percent vinyl toluene, 5 mole percent acrylonitrile, 5 mole percent methacrylonitrile, and 5 mole percent vinyl acetate.

EXAMPLE 23

The procedure of Example 1 is repeated with the difference that 70 mole percent of the methyl methacrylate is replaced with 20 mole percent ethyl acrylate, 10 mole percent 2-ethyl hexyl acrylate, 30 mole percent styrene, 5 mole percent divinyl benzene and 5 mole percent 1,3-dibutylene dimethacrylate.

EXAMPLE 24

The procedure of Example 4 is repeated except for the difference that the graded-rubbed particles having alpha-beta olefinic unsaturation are prepared in the following manner: To 1,000 parts by weight water which has been boiled and cooled to room temperature under a nitrogen atmosphere are added 2.86 parts by weight sodium dodecyl sulfate dissolved in 35.7 parts by weight water and about ⅑ of a monomer mixture consisting of 521 parts butyl acrylate and 48.5 parts by weight 1,3-butylene dimethacrylate. This mixture is stirred to establish dispersion of the monomers and 3.14 parts by weight potassium persulfate dissolved in 71.4 parts by weight water are added to the stirred mixture. This mixture is heated to 45° C. After about 10 minutes, addition of the remainder of the first monomer mixture is added at a rate such that the temperature of the reaction mixture is maintained at 47° to 50° C. During the addition of the last ⅔ of the first monomer mixture, 5.72 parts by weight sodium dodecyl sulfate dissolved in 35.7 parts by weight water are added at a substantially constant rate. The reaction mixture is maintained at about 47° to 50° C. for about sixty minutes prior to beginning simultaneous dropwise addition of the mixture of 1,180 parts by weight methyl methacrylate and 425 parts by weight hydroxyethyl methacrylate, 30 parts by weight dodecyl mercaptan, and 2.86 parts by weight sodium dodecyl sulfate dissolved in 35.7 parts by weight water. This addition, requires about 30 minutes, is carried out at a rate such that the temperature of the reaction mixture is maintained at about 47° to 50° C. Following this addition, the mixture is maintained at 47° to 49° C. for an additional two hours.

The emulsion is then coagulated by addition of 20 grams of concentrated hydrochloric acid solution and 100 ml. of water. The rubber particles are isolated by filtration and washed with methanol containing 1 weight percent of hydrochloric acid. The particles are then dried.

The hydroxy-functional particles in the quantity providing one mole of reactive hydroxyl groups on the collective surfaces thereof are suspended in toluene and 2,4-toluene diisocyanate, in the quantity necessary to provide about 3 isocyanate groups per each hydroxyl group, is incrementally added at a rate slow enough to keep the temperature of the reaction mix below 32° C. after the initial exotherm subsides, the reaction mixture is stirred for one hour.

The rubber-diisocyanate adduct is reacted with a hydroxylalkyl acrylate using the following procedure: The temperature of the reaction mix is raised to about 45° C. and hydroxyethyl methacrylate monomer is added in slight excess, (e.g., 5 to 7 percent excess) of that required to react with the unreacted isocyanate groups. It is added slowly and incrementally and the reaction is stirred continuously for several hours. The solvent is removed under vacuum until the solvent content of the product mix is less than 15 percent.

EXAMPLE 25

The procedure of Example 24 is repeated except for the difference that an equimolar amount of 1-tert-butyl-2,4-phenylene diisocyanate with 1 isocyanate group per molecule blocked with caprolactam is substituted for the 2,4-toluene diisocyanate.

The term "ionizing radiation" as employed herein means radiation having sufficient energy to remove an electron from a gas atom, forming an ion, e.g., radiation with minimum energy of, or equivalent to, about 5,000 electron volts except when the curing is carried out in a vacuum. The preferred method of curing films of the instant paint binders, when curable by ionizing radiation, is by subjecting such films to a beam of polymerization effecting electrons which at its source of emission is within the range of, or equivalent to, about 100,000 to about 500,000 electron volts. If irradiation is carried out in vacuum or at reduced pressure, this energy range may be considerably lower. In this method of curing, it is preferred to employ a minimum of about 25,000 volts per inch of distance between the radiation emitter and the workpiece where the intervening space is occupied by air or other gas of comparable density. Adjustment is made for the relative resistance of the intervening gas which is preferably an oxygen-free, inert gas such as nitrogen or helium.

In this application, the term "paint" is meant to include finely ground pigment and/or filler in the binder, the binder without pigment and/or filler or having very little of the same, which can be tinted, if desired. Thus, the binder, which is ultimately converted to a durable film resistant to wear, weather, etc. can be all or viturally all that is used to form the film or it can be a vehicle for pigmentary and/or mineral filler material.

The abbreviation "Mrad." as employed herein means one million rad. The term "rad." as employed herein means that dose of radiation which results in the absorption of 100 ergs of energy per gram of absorber, i.e., coating film. The electron emitting means may be a linear electron accelerator capable of producing a direct current potential in the range hereinbefore mentioned.

The terms "acrylate" and "acrylates," when used herein without a modifier distinguishing between esters of acrylic and methacrylic acid, shall be understood to include both. This, of course, does not apply to the naming of a specific compound.

The foregoing examples are illustrative of the invention defined in the appended claims. Those skilled in the are will be aware that modifications may be made therein without departing from the scope of the invention as set forth in the appended claims.

We claim:

1. In a method of electrodepositing a coating upon a metal substrate which comprises passing an electric current between an electrically conductive metal anode and an electrically conductive cathode in contact with an aqueous bath containing an aqueous dispersion of ionized paint binder resin, the improvement wherein said resin is intimately mixed prior to its deposition with a minor proporton by weight of a particulate elastomer consisting essentially of
   (1) a core of elastomer, and
   (2) an outer shell consisting essentially of the polymerization product of monomers selected from the group consisting of
      (a) methyl methacrylate, and
      (b) a mixture of methyl methacrylate and a remainder consisting essentially of monomers selected from monofunctional monoacrylates, difunctional monoacrylates, monovinyl hydrocarbons, divinyl hydrocarbons, acrylonitrile, methacrylonitrile, vinyl acetate, acrylic acid, methacrylic acid, said methyl methacrylate comprising at least 30 mole percent of said mixture, said core having glass transition temperature at least 50° C. below that of said outer shell, said minor proportion being an amount such that the concentration of said particulate elastomer in the resultant electrodeposited coating is in the range of about 5 to about 40 weight percent.

2. The method of claim 1 wherein said particulate elastomer has average diameter in the range of about 0.02 to about 1 micron.

3. The method of claim 1 wherein said particulate elastomer is employed in said aqueous dispersion in an amount such that the concentration of said particulate elastomer in the resultant electrodeposited coating is in the range of about 10 to about 30 weight percent.

4. The method of claim 1 wherein said ionized paint binder resin is a polycarboxylic acid resin having acid number in the range of about 30 to about 300 and electrical equivalent weight in the range of about 1,000 to about 20,000.

5. In a method of electrodepositing a coating upon a metal substrate which comprises passing an electric current between an electrically conductive metal anode and an electrically conductive cathode in contact with an aqueous bath containing an aqueous dispersion of ionized paint binder resin, the improvement wherein said resin is intimately mixed prior to its deposition with a minor proporton by weight of a particulate elastomer consisting essentially of
(1) a core of crosslinked acrylic polymer consisting essentially of
(a) a major amount of a monofunctional monoacrylate, and
(b) a minor and crosslinking amount of a di- or tri-functional monomer containing 2 or more non-conjugated terminal ethylenic groups, and
(2) an outer shell consisting essentially of the polymerization product of monomers selected from the group consisting of
(a) methyl methacrylate, and
(b) a mixture of methyl methacrylate and a remainder consisting essentially of monomers selected from monofunctional monoacrylates, difunctional monoacrylates, monovinyl hydrocarbons, divinyl hydrocarbons, acrylonitrile, methacrylonitrile, vinyl acetate, acrylic acid, methacrylic acid, said methyl methacrylate comprising at least 30 mole percent of said mixture, said core having glass transition temperature at least 50° C. below that of said outer shell, said minor proportion being an amount such that the concentration of said particulate elastomer in the resultant electrodeposited coating is in the range of about 5 to about 40 weight percent.

6. In a method of electrodepositing a coating upon a metal substrate which comprises passing an electric current between an electrically conductive metal anode and an electrically conductive metal cathode in contact with an aqueous bath containing an aqueous dispersion of ionized paint binder resin, the improvement wherein said resin is intimately mixed prior to its deposition with a minor proportion by weight of a particulate elastomer having average diameter in the range of about 0.02 to about 5 microns and consisting essentially of
(1) a core of crosslinked acrylic polymer consisting essentially of
(a) about 80 to about 98 mole percent of an ester of acrylic acid and a $C_2$–$C_8$ monohydric alcohol, and
(b) about 2 to about 20 mole percent of divinyl benzene, a diester of acrylic or methacrylic acid and a $C_2$–$C_8$ dihydric alcohol, or a triester of acrylic or methacrylic acid and a $C_2$–$C_8$ trihydric alcohol, and
(2) an outer shell consisting essentially of the polymerization product of monomers selected from the group consisting of (a) methyl methacrylate, and
(b) a mixture of about 30 to about 98 mole percent of methyl methacrylate and about 2 to about 70 mole percent of an ester of acrylic or methacrylic acid and a $C_2$–$C_8$ alcohol,
(c) a mixture of about 30 to about 98 mole percent methyl methacrylate, about 0 to about 30 mole percent of a $C_8$–$C_9$ monovinyl hydrocarbon, and 0 to 70 mole percent of an ester of acrylic or methacrylic acid and a $C_2$–$C_8$ monohydric alcohol,
(d) a mixture of about 30 to about 98 mole percent methyl methacrylate, about 2 to about 45 mole percent of a difunctional monoacrylate selected from glycidyl methacrylate, glycidyl acrylate, hydroxyethyl acrylate, hydroxypropyl acrylate, hydroxyethyl methacrylate, hydroxypropyl methacrylate, and 0 to about 68 mole percent of an alpha-beta unsaturated monomer selected from acrylonitrile, methacrylonitrile, styrene, methyl styrene, esters of acrylic acid or methacrylic acid and a $C_2$–$C_8$ monohydric alcohol, and isobornyl methacrylate,
(e) a mixture of about 30 to about 98 mole percent methyl methacrylate, about 2 to about 20 mole percent of a divinyl compound selected from divinyl benzene and the diesters of acrylic or methacrylic acid and $C_2$–$C_8$ dihydric alcohol, and 0 to 68 mole percent of an alpha-beta unsaturated monomer selected from acrylonitrile, methacrylonitrile, styrene, methyl styrene, vinyl toluene, esters of acrylic or methacrylic acid with a $C_2$–$C_8$ monohydric alcohol, isobornyl methacrylate, glycidyl methacrylate, glycidyl acrylate, hydroxyethyl acrylate, hydroxyethyl methacrylate, hydroxypropyl acrylate, hydroxypropyl methacrylate, and vinyl acetate, said minor proportion being an amount such that the concentration of said particulate elastomer in the resultant electrodeposited coating is in the range of about 5 to about 40 weight percent.

References Cited
UNITED STATES PATENTS

| | | | |
|---|---|---|---|
| 3,476,668 | 11/1969 | Scheiber et al. | 204—181 |
| 3,532,613 | 10/1970 | Gilchrist | 204—181 |

HOWARD S. WILLIAMS, Primary Examiner